United States Patent
Stackhouse

(10) Patent No.: US 10,165,729 B2
(45) Date of Patent: Jan. 1, 2019

(54) SHAKER HEAD AND RELATED METHODS

(71) Applicant: Don Stackhouse, Hickman, CA (US)

(72) Inventor: Don Stackhouse, Hickman, CA (US)

( * ) Notice: Subject to any disclaimer, the term of this patent is extended or adjusted under 35 U.S.C. 154(b) by 27 days.

(21) Appl. No.: 15/418,706

(22) Filed: Jan. 28, 2017

(65) Prior Publication Data

US 2017/0215341 A1 Aug. 3, 2017

Related U.S. Application Data

(60) Provisional application No. 62/288,293, filed on Jan. 28, 2016.

(51) Int. Cl.
 *A01D 46/00* (2006.01)
 *A01D 46/26* (2006.01)

(52) U.S. Cl.
 CPC .................. *A01D 46/264* (2013.01)

(58) Field of Classification Search
 CPC . A01D 46/26; A01D 46/264; A01D 2046/268
 USPC ........................................ 56/340.1
 See application file for complete search history.

(56) References Cited

U.S. PATENT DOCUMENTS

| | | | | |
|---|---|---|---|---|
| 3,460,329 A | * | 8/1969 | Overstreet, Jr. | A01D 46/26 294/115 |
| 3,564,825 A | | 2/1971 | Gould et al. | |
| 4,286,426 A | * | 9/1981 | Orlando | A01D 46/28 56/330 |
| 4,409,782 A | | 10/1983 | Westergaard et al. | |
| 4,621,488 A | * | 11/1986 | Claxton | A01D 46/26 56/330 |
| 5,074,108 A | * | 12/1991 | Claxton | A01D 46/26 56/330 |
| 5,473,875 A | | 12/1995 | Zehavi et al. | |
| 5,595,054 A | * | 1/1997 | Reynolds de Sousa | A01D 46/26 56/340.1 |
| 5,765,349 A | | 6/1998 | Michelson | |

(Continued)

OTHER PUBLICATIONS

Whitney et al., Dynamic Analysis of a Trunk Shaker Post System, Transactions of the ASAE, vol. 33, No. 4, pp. 1066-1070, 1990.

(Continued)

*Primary Examiner* — Thomas B Will
*Assistant Examiner* — Mai T Nguyen
(74) *Attorney, Agent, or Firm* — William K. Nelson; Mark D. Miller

(57) ABSTRACT

A shaker head including bilateral eccentric weights connected to a single motor by a chain system that maintains the relative positioning and angular velocity of the eccentric weights without variance or slippage, where the relative position of the eccentric weights may be adjusted during non-operation to accommodate application of the shaker to head various tasks. The bilateral weights may be arranged in substantially symmetrical positions with respect to the midline of the shake head to improve balance of the shaker head. The shaker head may also include a third shaker head at third position to reduce undesired and inefficient shaking patterns in the shaker head during operations. The shaker head may be adaptable to various vehicles and machinery, such as trucks and tractors. The shaker head is operable to engage the trunk or limbs of a tree for purposes of harvesting fruit from the tree.

20 Claims, 5 Drawing Sheets

(56) References Cited

U.S. PATENT DOCUMENTS

| | | | | |
|---|---|---|---|---|
| 5,842,334 | A | * | 12/1998 | Slates .................... A01D 46/28 56/340.1 |
| 5,904,034 | A | * | 5/1999 | Youman ................. A01D 46/00 56/328.1 |
| 5,921,074 | A | * | 7/1999 | Scott ...................... A01D 46/28 56/330 |
| 6,672,044 | B1 | * | 1/2004 | Zehavi ................... A01D 46/26 56/340.1 |
| 6,978,591 | B2 | | 12/2005 | Zehavi et al. |

OTHER PUBLICATIONS

Attar et al., Physical Properties Effects on Shakermodel Harvesting of Olive-Trees.
Gil et al., Modal Testing of Trunk Shakers Used in Olive Mechanical Harvesting, Information and Technology for Sustainable Fruit and Vegetable Production, FRUTIC 05, 12, Sep. 16, 2005.
Snell, Force and moment analysis of stacked counter rotating eccentric mass tree shaker energy-wheel system, Master's Thesis, Iowa State University Ames, Iowa 2008.

\* cited by examiner

0°

90°

180°

360°

SHAKER HEAD AND RELATED METHODS

FIELD OF THE INVENTION

The present invention relates to an apparatus for engagement with a portion of a tree to impart a substantial force against the tree to cause the tree to shake and methods of using the same. Particularly the present invention is directed to a shaker head for converting rotary input motion from a motor to a linear reciprocating motion and transferring the reciprocating motion to an object engaged by the shaker head (e.g., a tree), and related methods.

DISCUSSION OF THE BACKGROUND

Tree shaking machines are hydro-mechanical systems generally used for nut and fruit harvesting (e.g., almonds, walnuts, pecans, pistachios, cherries, etc.). Tree shaking technologies were developed as early as the 1960s, and were initially developed for harvesting fruit from nut and olive trees. Many inertial shakers that are used today were developed in the early 1970s. Generally, conventional tree shakers are of two types: (1) a slider crank mechanism, which may or may not be an inertia type shaker, and which provides a linear shaking motion, and (2) a mechanism that uses rotating eccentric masses which normally do not provide linear motion.

Linear inertial shakers may utilize the traction of a cable connected to a piston rod-handle system or just by the vibration produced by an eccentric mass in rotation to generate a linear motion. However, the more common shakers utilize rotation of eccentric weight wheels to shake a tree to which the tree shaking machine is attached to thereby create vibrations in the tree to dislodge a crop (e.g., fruit or nut) form the tree. This type of vibration is carried out by the superposition of the frequencies produced by 2 or 3 wheels, with eccentric masses that rotate typically with a frequency between 18 and 40 Hz, accelerating the fruits to separate them from the trees.

Existing tree shakers that utilize eccentric weights have unpredictable moments of force. The moment of force of such machines is typically only rudimentarily characterized by a general shake pattern. These basic patterns are always circular, but they are random and unpredictable because the rotation of the eccentric weights are not closely controlled or coordinated in conventional shakers. Thus, the impact points of the shaker on the tree are also randomized and essentially out of control.

Conventional shakers may move the tree clamp and the attached tree in a randomly changing manner from side-to-side (which is ideal) to a front-to-back (which is imparts little or no movement to the tree), oblique directions therebetween (which provide inefficient shaking), and rotational motion around the axes of rotation (also inefficient movement and may cause wear on the shaker itself). The front-to-back, obliquely, and rotationally applied forces may cause damage to the tree's trunk and limbs and cause excessive heating and clamp wear. Trunk and limb damage includes primarily "barking" damage that may be characterized as tearing or bruising at the cambium layer of the tree, which damages the trees xylem and phloem cells that are responsible for nutrient transfer. Barking may diminish the tree's ability to transfer nutrients to limbs where fruit is grown and can therefore impact the production of the tree. In some instances, tree shakers can result in catastrophic damage to the trunk that renders the tree non-productive (e.g., significant tissue damage to the tree or a wound that results in a devastating infection of the tree, such as a fungal infection). Thus, tree trunk and limb damage can be both acute and cumulative, and can result in significant production loss from an orchard due to the reduction in the productive life span of trees and/or incremental reduction in the production of a damaged tree.

It is therefore desirable to provide an improved tree shaking device that reduces inefficiencies in the transfer of energy from the shaker head to the structure or object engaged by the shaker head (e.g., a fruit or nut tree), and that reduces the amount of damage to the trunk and limbs of trees engaged by the shaker head. The present invention provides such apparatuses and methods of using the same, while at the same time accomplishing many of the desirable conditions described above.

SUMMARY OF THE INVENTION

The present invention provides an improved tree shaker devices having lateral rotating masses that are coordinated to increase the efficiency of the shaker and reduce damage to trees and the shaker itself, and methods of using the same.

The present invention may allow for the coordination of the rotation of eccentric weights of a tree shaking apparatus, such that the shaking motion is maintained in a predictable and consistent direction or pattern (e.g., side-to-side) such that the energy and motion generated by the rotation of the eccentric weights is transferred efficiently to a targeted tree or other structures. The rotational velocity and rotational positions of the eccentric weights may be closely controlled in the shaker apparatus in the present invention such that the relative positions of the eccentric weights are maintained without significant variation.

The tree shakers of the present invention may include a case structure for housing the shaker unit that includes two or more eccentric rotating masses (e.g., wheels having eccentric weights mounted thereon), a clamp arm for grasping a tree trunk or limb or other targeted structure, a driving system for driving the rotation of the eccentric weights (e.g., a hydraulic drive motor, an electric motor, etc.), a driving pulley on an axle driven by the driving system, and at least one drive chain or belt for transmitting the rotation of the driving pulley to sprockets or other means of "interlockingly" engaging the drive chain to the rotational axes two or more rotating masses such that the relative angular position of the rotating masses is maintained substantially without slippage as they spin. In some embodiments, and without limitation, the tree shaker may include a third rotating mass (e.g., a having an eccentric weight thereon) located proximally in the shaker head relative to the two laterally positioned rotating masses. A rotational shaft of the third rotating mass may be engaged by a drive chain or belt that is engaged directly or indirectly with the motor (e.g., by common attachment to a passive axle driven by the motor), such that all three rotating masses may be driven by a single motor. In some embodiments, and without limitation, the tree shakers of the present invention may be mounted on a tractor or other vehicle or trailer that may include an adjustable support frame (e.g., at the front end of the vehicle) for the shaker head.

A shaker head according to the present invention may include at least two rotating masses (e.g., eccentric weight wheels) positioned in a laterally symmetrical arrangement relative to a central axis or midline of the shaker head. The centers of mass of the symmetrically positioned eccentric weight wheels may be substantially on a same horizontal plane, such that the forces created by the rotation of the eccentric weights can be balanced through coordination of the angular velocity of the eccentric weight wheels and the relative angular positions of the eccentric weights. The planar bilateral arrangement of the eccentric weights in the present invention may reduce moments of force along the horizontal plane in which the shaker head is attached to the tree. In embodiments of the present invention, the bilaterally positioned eccentric weights may be coordinated in such a manner to minimize the loss of energy in undesired directions, and efficiently focus the shaking energy in coordinated lateral motions with respect to the central axis of the shaker head. The eccentric weights may be arranged such that they align when they reach angular positions that are 90° relative to the central axis of the shaker head such that their moments of force align and are directed substantially laterally and horizontally. This arrangement of the eccentric weights may create a preferred side-to-side motion of the shaker head. This coordinated arrangement may include the following: the two bilaterally arranged eccentric weights may have the same mass, the location of the centers of mass of the bilaterally arranged eccentric weights may be located the same radial distance from their respective rotational shafts, the centers of mass of the bilaterally arranged eccentric weights may be located on the same plane, the bilaterally arranged eccentric weights may be counter-rotated during operation of the shaker, and the bilaterally arranged eccentric weights may have the same angular velocity.

The rotation of the bilaterally arranged eccentric weights may be coordinated during operation of the machine such that the eccentric weights are rotating at the same angular velocity in opposite directions and the centers of mass of both weights are aligned twice during each 360° rotation of the weights, (1) with both centers of mass aligned on a line perpendicular to the central axis of the shaker head and toward a first lateral side of the shaker head (e.g., both positioned as far to the right lateral side as possible), and (2) with both centers of mass aligned on a line perpendicular to the central axis of the shaker head and toward a second lateral side of the shaker head (e.g., both positioned as far to the left lateral side as possible). As a further illustration, an analogy to analog clocks may be used. If both eccentric weights are visualized as the face of a clock with the 12 to 6 axis being parallel with the central axis of the shaker head, the centers of mass of the eccentric weights line up at 3 o'clock and 9 o'clock during each 360 rotation of the eccentric weights around their rotational axes, even though the spin in opposite directions (one spins clockwise, and one spins counterclockwise). FIGS. 1A-1D of the present application demonstrates the rotation pattern of the bilateral eccentric weights (see discussion below).

The laterally arranged eccentric weights may be connected by one or more drive chains or belts in such a manner so that they turn in opposite directions and the angular positions and angular moments of the eccentric weights are coordinated. The eccentric weights maintain their relative angular positions as they spin because the drive chain or belt "interlockingly" engages the rotational shafts to which the eccentric weights are attached so that they cannot slip out of position relative to one another (e.g., the drive chain(s) may be roller chain(s) that engage with sprockets on the rotational shafts). This coordination allows the force generated by the rotation of the eccentric weights to be additive and maximizes the shaking force against the tree in a lateral, side-to-side manner. The precise timing also reduces or eliminates the occurrence eccentric weights fighting against each other during the impact moments, limiting the forces applied to the tree primarily to the side-to-side shaking that occurs with the eccentric weights are laterally aligned, thereby focusing the energy of the shaker head in vectors that are substantially perpendicular to the surface of the tree to generate shaking and reducing forces transferred to the tree at angles that are oblique or parallel to the surface of the tree. Such oblique and parallel forces cause the clamp of the shaker head to move along the surface of the tree, causing barking and other damage. Additionally, these forces result in the need for greater clamp pressures to hold the shaker on the tree. When the eccentric weights are not lined up with the tree side-to-side, one is rotating forward while the other rotates to the rear thereby reducing undesirable front to back motion. It is to be understood that alternative arrangements of the eccentric weights are contemplated within the scope of the present invention. Other relative angular positions of the eccentric weights may be used for other applications to thereby generate different shaking patterns. Novel methods of adjusting the relative angular positions of the eccentric weights are discussed below.

With the two bilaterally, symmetrically arranged eccentric weights of the same mass having centers of mass located the same radial distance from their respective rotational shafts and on the same plane configured to counter-rotate during operation at the same angular velocity, there may still be forces generated that lead to inefficiencies and that result in oblique and parallel forces applied to a tree by the clamp of the shaker head (e.g., pitching, yaw, rolling, or longitudinal shifting motion of the clamp). For example, the rotation of the eccentric weights generate angular momentum that are parallel to the plane of rotation because there is a lever arm that exists along the rotational shaft of to which the eccentric weights are attached (e.g., between the eccentric weights and the point at which the chain or belt acts on the rotational shaft). Thus, even though the bilateral, coplanar eccentric weight system eliminates much of the inefficient moments and forces in the shaker head, there may still be some undesired forces exerted by the shaker head.

The shaker heads of the present invention may include a third eccentric weight that may be located proximally to the two lateral symmetrically positioned weights eccentric weights on or within the shaker head. The third eccentric weight may function to damp inefficient movements in the shaker head during a shaking operation. For example, the rotation of the eccentric weights may create inefficient motion in the shaker head (e.g., pitching, yaw, rolling, or longitudinal shifting motion of the clamp) that can damage tree bark and cause wear and tear on the shaker head. The third eccentric weight may be angularly positioned to be out of phase with the two symmetrically positioned weights to compensate for pitching, rolling, or other inefficient motion. The third rotating mass may be positioned on the same horizontal plane as the two bilaterally positioned weights. However, it may vary in several important characteristics from the bilaterally positioned weights. Third eccentric weight may have a different mass, the center of mass may be located at a different radial distance from its rotational shaft, and the third eccentric weights may have a different angular velocity. Also, the third eccentric weight may be located along the central axis of the shaker head or offset from a center axis of the shaker head.

The eccentric weights of the present invention (e.g., the two bilaterally positioned eccentric weights and the third eccentric weight) may be connected to one or more motors by a belt or chain that prevents slippage between the belt or chain and sprockets on the rotational shafts with which the belt or chain is engaged. For example, the present invention may use a roller chain that interlockingly engages with complementarily toothed sprockets on the rotational shafts. This interlocking engagement of the roller chain and the sprockets prevents slippage between the roller chain and the sprockets and thereby maintains the rotational timing and coordination of the eccentric weights. As a result, the rotational pattern of the eccentric weights may be consistent and maintained throughout operation of the shaker head. It is to be appreciated that other kinds of belts or chains that are operable to interlockingly engage with a sprocket may be used as well (e.g., toothed belts and belt pulleys, etc.).

The shaker head of the present invention may utilize one or more passive sprocket pulleys located between the two laterally symmetrical eccentric weight wheels to route the drive chains or belts around the rotational shafts of the eccentric weight wheels and a driving sprocket of the motor(s). For example, there may be a central passive rotational axle having two sprocket wheels thereon for transmitting the rotational motion from the driving shaft of the motor and the driving chain or belt engaged therewith to one or more other driving chains or belts engaged with the other eccentric weight wheel(s). The placement of the passive sprocket pulleys along the central axis of the shaker head may further aid in reduce the undesired motion of the shaker head. For example, any upward or downward angular moments that result from the torque applied to the centrally located sprockets may be directed along the plane of the central axis of the shaker head, thereby reducing any rolling or yawing effects that such moments would have if the sprocket were located at a lateral position.

The shaker heads of the present invention may utilize roller chain and sprockets, toothed belts and belt pulleys, or other systems that have an interlocking relationship to hold the eccentric weight wheels in their relative angular positions during shaking operations. It is key to the invention that the drive chains or belts "interlockingly" engage with the sprocket wheels of the rotational axels of the passive sprocket wheels and the eccentric weight wheels such that the relative angular positions of the axels do not change during operation of the shaker head. This is to say that engagement of the driving chain or belt with the sprockets of the rotational axels is sufficiently tight that the driving chain or belt does not slip on the axels.

The interlocking chain system allows the two laterally positioned weights can be locked into a preselected phased relationship to produce the desired lateral shaking pattern. The counter-rotating arrangement maintained by the interlocking chain or belt, and as shown in FIG. 1, generates as little front-to-back and oblique movement as possible. The rotational shaft of the third rotating mass may be engaged by a drive chain or belt that is engaged directly or indirectly with the motor (e.g., by common attachment to a passive axle driven by the motor), such that all three rotating masses may be driven by a single motor.

In some embodiments, the shaker head may not include any passive (idler) sprockets, and may instead include a design in which there is a motor on each side of the shaker head, and the rotational shafts of the eccentric weights are connected by roller chain (or other interlocking chain or belt) to sprockets mounted directly on the rotating drive shaft of the corresponding motor. For example, and without limitation, a first motor may be positioned within a first lateral side of the shaker head along with a first bilateral eccentric weight connected with a driving shaft of the motor by a roller chain, and a second motor may be positioned within a second lateral side of the shaker head along with a second bilateral eccentric weight and a third eccentric weight, where the second bilateral eccentric weight and the third eccentric weight are connected with the drive shaft of the second motor by roller chains. Thus, in such embodiments, the rotational shaft of each eccentric weight may be directly connected to the driving shaft of the motor located on the same lateral side of the shaker head by a roller chain with no intervening idler sprockets. In such embodiments, the number of rotational shafts on which torques are created is reduced thereby limiting the potential angular momentum directed at angles that are oblique or perpendicular to the desired lateral shaking motion.

Notwithstanding the embodiments described above, the shaker head system of the present invention may also allow for numerous adjustments to the shape and the direction of the vibratory pattern through changes to the direction of rotation of the rotational shafts of the two symmetrically positioned eccentric weights in relation to each other, the number of revolutions of each shaft (the transmission ratio), and the torque of each shaft. It may be advantageous in some applications of the shaker head to change the relative phase or overlap between the path of the two symmetrically positioned eccentric weight wheels. A chain (e.g., a roller chain) and sprockets may be used in the present invention in order to may subtle and steadfast adjustments to the relative positions or phases of the eccentric weight wheels. For example, and without limitation, a sprocket on one of the eccentric weights may be advanced by one gear tooth on the drive chain to adjust the phase of the two eccentric weight wheels (e.g., to fine tune the shaking pattern of the shaker head). The sprockets are held fast in their angular positions relative to each other without substantial variation by link slot with which they are respectively engaged. It may be easier, faster, and simpler to change the transmission ratio, the eccentricity position, and the direction of rotation of the eccentric weights of the present invention in comparison to conventional shaker apparatuses. The transmission ratio and the synchronization between the laterally symmetrical eccentric weight wheels may be accomplished by means of a single motor that drives both laterally symmetrical eccentric weights through connection indirect connection by one or more driving chains or belts. In other embodiments, the two bilaterally positioned eccentric weights may be connected to two different motors, one on each lateral side of the shaker head. In such embodiments, the ratio of the two bilaterally positioned weights may be maintained by aligning the centers of mass of the bilaterally positioned weights prior to initiating operation, synchronizing speed and balancing the torque of the two motors, and coordinating the ignition of the two motors.

Additionally, the angular position and phase of the third eccentric weight wheel can be adjusted as well to compensate for various shaking patterns induced by the symmetrically positioned eccentric weight wheels. Due to the efficiencies created by the precise coordination of the rotation of the eccentric weight wheels (including the third eccentric weight wheel), the shaker head of the present invention is able to significantly reduce undesired rolling and front-to-back motion, thereby increasing the efficiency of the shaker head relative to conventional designs. The improvements in efficiency allow the shaker head to be effective with less massive eccentric weights.

The shaker head may engage a targeted object (e.g., a tree) by applying compressive force through two laterally opposed shaker arms that may be positioned at opposing sides of a tree trunk or other targeted object. The shaker arms may be outfitted with pad and sling structures that may provide a compressible pad structure that provides enhanced surface area contact with the targeted structure. The deformation of the compressible pad structure may both be useful to (1) both maximize the transfer of forces to the tree by providing a stable hold on the targeted structure with increased surface contact between the pad structure and the targeted structure due to the compression of the pad structure, and (2) reduce friction, slipping, and grinding between the pad structures and the targeted structure (e.g., a tree trunk), limiting the transmission of unwanted shaker head forces between the pad structure and the targeted structure, which may reduce or prevent barking of tree trunks and limbs. The pad may include an outer compressible sling which may include one or more layers of a flexible material (e.g., a polymer material, such as a firm rubber), and an inner pad structure, which may be made from a compressible material (e.g., a semi-rigid polymeric foam). The pad structure may additional include a cooling and/or lubricating system for reducing thermal build-up within the pad structure during shaking operation. For example, and without limitation, the shaker head may outfitted with a compressor or compressed air tank that provides compressed air that may be blown into the pad structure through a hose system. In other implementations, and without limitation, the shaker head may include a lubrication system, providing a liquid. The clamp arm may be hydraulically clamped to a tree or other structure prior to shaking operation. The two symmetrically positioned eccentric weight wheels may be mounted within the shaker head, and the third eccentric weight wheel may be positioned proximally in the shaker head relative to the two symmetrically positioned wheels.

The shaker head may be mounted on a vehicle (agricultural tractor or other appropriate vehicle) having an attached structure that suspends the shaker and buffers the vehicle from the vibrational energy of the shaker, so as to prevent transmission of the vibrations to the vehicle. Typically, the shaker is mounted in the front of the vehicle in order to allow good operation visibility.

Apparatus of the present invention may be used to shake a fruit bearing tree to accelerate fruit on the tree such that the fruit breaks away from the tree and falls onto a collector or the ground. In harvesting fruit that requires care in handling, the apparatus of the present invention may be employed in conjunction with other harvesting equipment to collect the fruit without excessive fruit damage and handle same for further processing.

The present invention provides new solutions and uses vibration parameters, phase-controlled impact vibration, allowing the creation of a practical agricultural device that can be used by tractors and motorized vehicles, with a simple design providing an easy maintenance and low price, efficient and profitable equipment.

The present invention allows the use of less massive weights and less power required to rotate the eccentric weights due to the increased efficiency and coordination of the forces generated by the weights, while having equal or greater efficiency in fruit harvest, compared with conventional shakers. Due to the phase-controlled impact vibration, the present invention offers at least two advantages over conventional shakers, greater displacement of the fruit or branches during the shaking (with use of equal or less energy by the motor and equally or less massive eccentric weights), and the preservation of the tree due to the limiting of inefficient motion that can lead to barking and other damage.

In one aspect, the present invention relates to an improved shaker mechanism for use in a tree shaker having a mobile frame and means for engaging a tree, comprising two laterally positioned eccentric weights, wherein the laterally positioned weights are symmetrically positioned with respect to a central axis of a shaker head; at least one central sprocket wheel located on the central axis of the shaker head; a motor for driving the rotation of the laterally positioned eccentric weights; and at least one drive chain or belt operable to engage with sprockets on the axes of the laterally positioned eccentric weights, wherein relative angular positions of the two laterally positioned eccentric weights are held constant by the at least one drive chain or belt.

In a second aspect, the present invention relates to a shaker head comprising a means for gripping a work object; two collateral eccentric weights rotatably mounted on the shaker head, the eccentric weights collaterally aligned and symmetrically spaced from a central axis of the shaker head, wherein rotational axes of the eccentric weights are parallel to each other and perpendicular to the central axis of the shaker head a third eccentric weight positioned proximally relative to the two laterally positioned eccentric weights; and a single driving motor connected to the collateral eccentric weights and the third eccentric weight by at least one driving chain or belt, wherein the at least one driving chain or belt interlockingly engages with rotational shafts of the collateral eccentric weights and the third eccentric weight such that (1) the relative angular positions of the collateral eccentric weights are held constant by the at least one drive chain or belt, and (2) there is no substantial variation in a angular velocity of the third eccentric weight relative to angular velocities of the collateral eccentric weights during a shaking operation of the shaker head.

In a third aspect, the present invention relates to a method for adjusting a shaking pattern of a shaker head having two eccentric weights wherein the weights positioned laterally with respect to a central axis of a shaker head, at least one central sprocket wheel located on the central axis of the shaker head, a motor for driving the rotation of the eccentric weights, and at least one drive chain or belt operable to engage with sprockets on the axes of the laterally positioned eccentric weights, wherein relative angular positions of the two laterally positioned eccentric weights are held constant by the at least one drive chain or belt, the method comprising disengaging the at least one drive chain or belt from at least one of the laterally positioned eccentric weights; rotating angular position of the one of the laterally positioned eccentric weights relative to the other the laterally positioned eccentric weight; and re-engaging the at least one drive chain or belt with the at least one laterally positioned eccentric weight after rotating the angular position.

In a fourth aspect, the present invention relates to a shaker head comprising a mechanical clamp for firmly grasping a tree trunk; a first bilaterally positioned eccentric weight and a second bilaterally positioned eccentric weight, each rotatably mounted on the shaker head, the first and second bilaterally positioned eccentric weights being bilaterally and symmetrically aligned and spaced from a central axis of the shaker head, wherein rotational axes of the eccentric weights are parallel to each other and perpendicular to the central axis of the shaker head; a third eccentric weight positioned proximally relative to the two bilaterally positioned eccentric weights; and a first driving motor connected to the first bilaterally positioned eccentric weight by a first driving chain or belt that interlockingly engages with a rotational shaft of the first bilaterally positioned eccentric weight; a second driving motor connected to the second bilaterally positioned eccentric weight and the third eccentric weight by a second driving chain or belt, wherein the second driving chain or belt interlockingly engages with rotational shafts of the second bilaterally positioned eccentric weight and the third eccentric weight, wherein the ignition and angular velocity of the drive shafts of the first and second motors are substantially synchronized, and such that there is no substantial variation in angular velocity between the bilaterally positioned eccentric weights and the third eccentric weight during a shaking operation of the shaker head. The bilaterally positioned eccentric weights are located on a same horizontal plane. The bilaterally positioned eccentric weights have the same mass. The bilaterally positioned eccentric weights may have the same size and shape. The bilaterally positioned eccentric weights may be located at a same radius from their respective rotational axes. The bilaterally positioned eccentric weights and the third eccentric weight may be located on a same horizontal plane. The bilaterally positioned eccentric weights may be operable to rotate at the same angular velocity during operation, and centers of mass of the two laterally positioned eccentric weights are in phase in a first instance and a second instance during each 360° rotation of the two bilaterally positioned eccentric weights. The centers of mass of the two bilaterally positioned eccentric weights may be in phase in the first instance along a line that is perpendicular to the central axis of the shaker head such that the centers of mass are at their closest point to a first lateral side of the shaker head, and the centers of mass of the two bilaterally positioned eccentric weights may be in phase in the second instance along a line that is perpendicular to the central axis of the shaker head such that the centers of mass are at their closest point to a second lateral side of the shaker head.

It is a primary object of the present invention to provide a shaker head that is more efficient with respect to the energy used to generate acceleration of targeted trees than conventional shakers.

It is also an object of the present invention to provide a novel shaker head having reduced inefficient motion during a shaking operation, thereby reducing damage to targeted trees (e.g., barking) and impact on the yield of the tree.

It is also an object of the present invention to provide a novel shaker head operable to generate the same or greater lateral forces in comparison to conventional shaker heads, while using less massive eccentric weights and less fuel energy.

It is also an object of the present invention to provide a such a shaker head in which the eccentric weights may be coordinated to provide a substantially lateral vibration to the clamping mechanism that in turn efficiently transmits energy to the tree and reduces or prevents tangential or oblique force vectors that may damage a targeted tree or other structure and reduce the efficiency of the shaker head.

It is also an object of the present invention to provide a shaker apparatus for that includes at least two shafts onto which eccentric weights are mounted, the transmission ratio and the direction of rotation of the shafts in relation to each other being adjustable and changeable.

Additional objects of the invention will be apparent from the detailed descriptions and the claims herein.

DETAILED DESCRIPTION

Figure 1A:
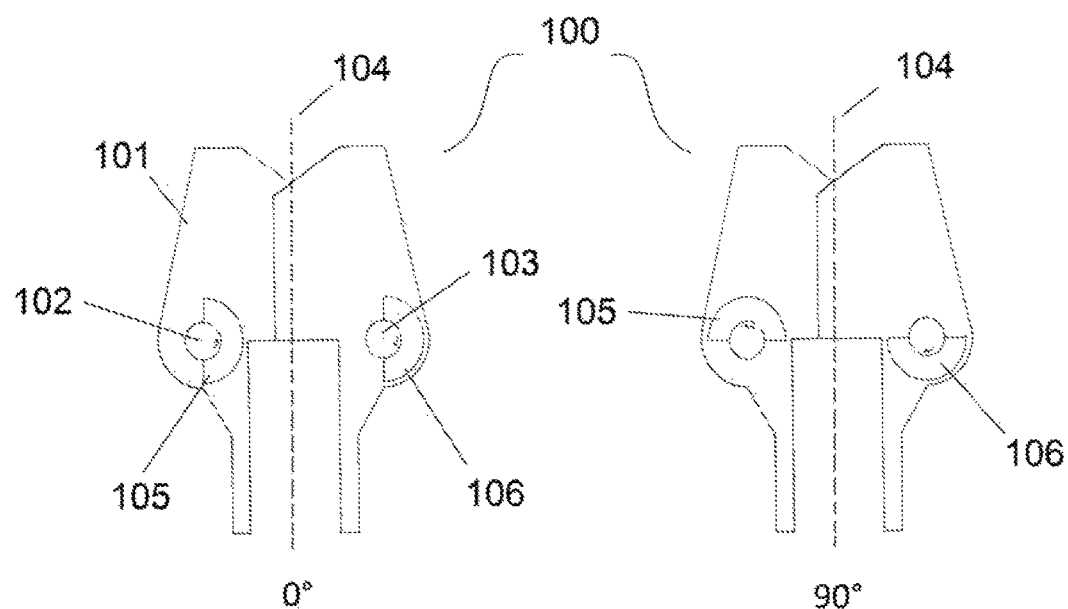
FIG. 1A provides a plan view of a shaker head according to an embodiment of the present invention, showing first coordinated positions of bilaterally positioned eccentric weights therein.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

A shaker head including bilateral eccentric weights connected to a single motor by a chain system that maintains the relative position of the eccentric weights without variance or slippage, where the relative position of the eccentric weights may be adjusted during non-operation to accommodate application of the shaker to head various tasks. The bilateral weights may be arranged in substantially symmetrical positions with respect to the midline of the shake head to improve balance of the shaker head. The shaker head may also include a third shaker head at third position to reduce roll and inefficient shaking patterns in the shaker head during operations. The shaker head may be adaptable to various vehicles and machinery, such as trucks and tractors. The shaker head is operable to engage the trunk or limbs of a tree for purposes of harvesting fruit from the tree, but is also operable to perform other tasks.

Referring to the drawings wherein like reference characters designate like or corresponding parts throughout the several views, and referring particularly to FIGS. 1-5, it is seen that the present invention includes various embodiments of a shaker head apparatus that is configured to provide a balanced and efficient shaking operation for harvesting tree crops, as well as other applications.

The rotation of the bilaterally arranged eccentric weights may be coordinated during operation of the machine such that the eccentric weights are rotating at the same angular velocity in opposite directions and the centers of mass of both weights are aligned twice during each 360° rotation of the weights, (1) with both centers of mass aligned on a line perpendicular to the central axis of the shaker head and toward a first lateral side of the shaker head (e.g., both positioned as far to the right lateral side as possible), and (2) with both centers of mass aligned on a line perpendicular to the central axis of the shaker head and toward a second lateral side of the shaker head (e.g., both positioned as far to the left lateral side as possible).

FIGS. 1A-1D of the present application demonstrate the rotation pattern of the bilateral eccentric weights. FIGS. 1A-1D show a shaker head 100 having a body or housing 101, a central axis 104 (e.g., a line of symmetry), rotational shafts 102 and 103 (left and right), and eccentric weights 105 and 106 (left and right) each attached to one of the rotational shafts. FIG. 1A shows the eccentric weights 105 and 106 in a starting position, where both eccentric weights are in phase and aligned along a line perpendicular to the central axis 104 and positioned to the right (e.g., at 3 o'clock). When the weights are in the position shown in FIG. 1A, the force generated by the rotation of the eccentric weights is directed in a right lateral direction causing lateral shaking of the clamping mechanism and a tree to which the clamping is engaged. This kind of lateral movement is the desired form shaking that transmits most efficiently to the trunk of the tree.

Figure 1B:
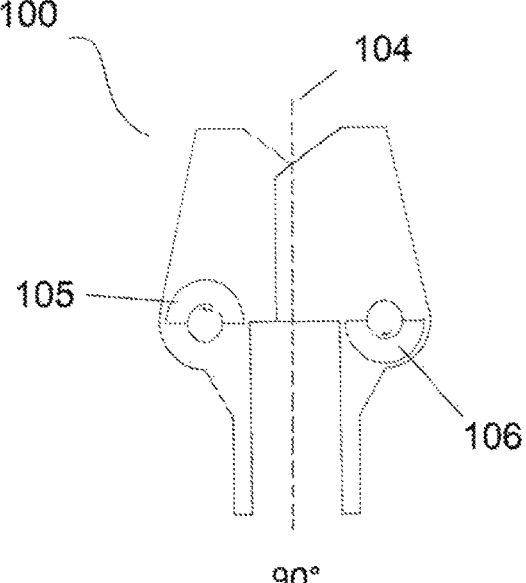
FIG. 1B provides a plan view of a shaker head according to an embodiment of the present invention, showing second coordinated positions of bilaterally positioned eccentric weights therein.

FIG. 1B shows the positions of the eccentric weights after 90° of rotation in each of the rotational shaft 102 and 103. In this example, the eccentric weights are 180° out of phase because the rotational shafts rotate with the same angular velocity in opposite directions (e.g., clockwise and counter-clockwise, respectively). In FIG. 1B, the forces generated by the eccentric weights are directed in substantially opposing forward (distal) and rearward (proximal) directions, which substantially counterbalance such that the tendency of the shaker head to move in a proximal or distal direction is reduced or prevented.

Figure 1C:
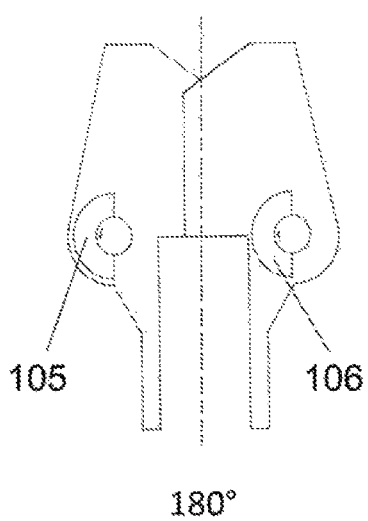
FIG. 1C provides a plan view of a shaker head according to an embodiment of the present invention, showing third coordinated positions of bilaterally positioned eccentric weights therein.

FIG. 1C shows the positions of the eccentric weights after 180° of rotation in each of the rotational shaft 102 and 103. In this example, the eccentric weights are in phase and aligned along a line perpendicular to the central axis 104 and positioned to the left (e.g., at 9 o'clock). When the weights are in the position shown in FIG. 1C, the force generated by the rotation of the eccentric weights is directed in a left lateral direction causing lateral shaking of the clamping mechanism and a tree to which the clamping is engaged. This lateral movement transmits force and motion efficiently to the trunk of the tree.

Figure 1D:
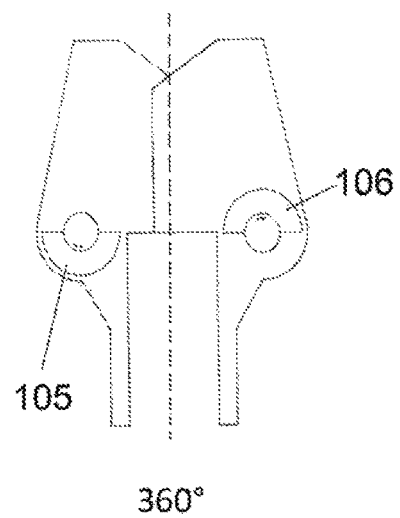
FIG. 1D provides a plan view of a shaker head according to an embodiment of the present invention, showing fourth coordinated positions of bilaterally positioned eccentric weights therein.

FIG. 1D shows the positions of the eccentric weights after 270° of rotation in each of the rotational shaft 102 and 103. In this example, the eccentric weights are 180° out of phase and the forces generated by the eccentric weights are directed in substantially opposing forward (distal) and rearward (proximal) directions, which substantially counterbalance such that the tendency of the shaker head to move in a proximal or distal direction is reduced or prevented. It is to be understood that the representation of a shaker head 100 shown in FIGS. 1A-1B is not complete, and the views are provided simply to demonstrate the rotational patterns of the eccentric weights. More detailed descriptions of the shaker heads of the present invention are provided herein below.

Figure 2:
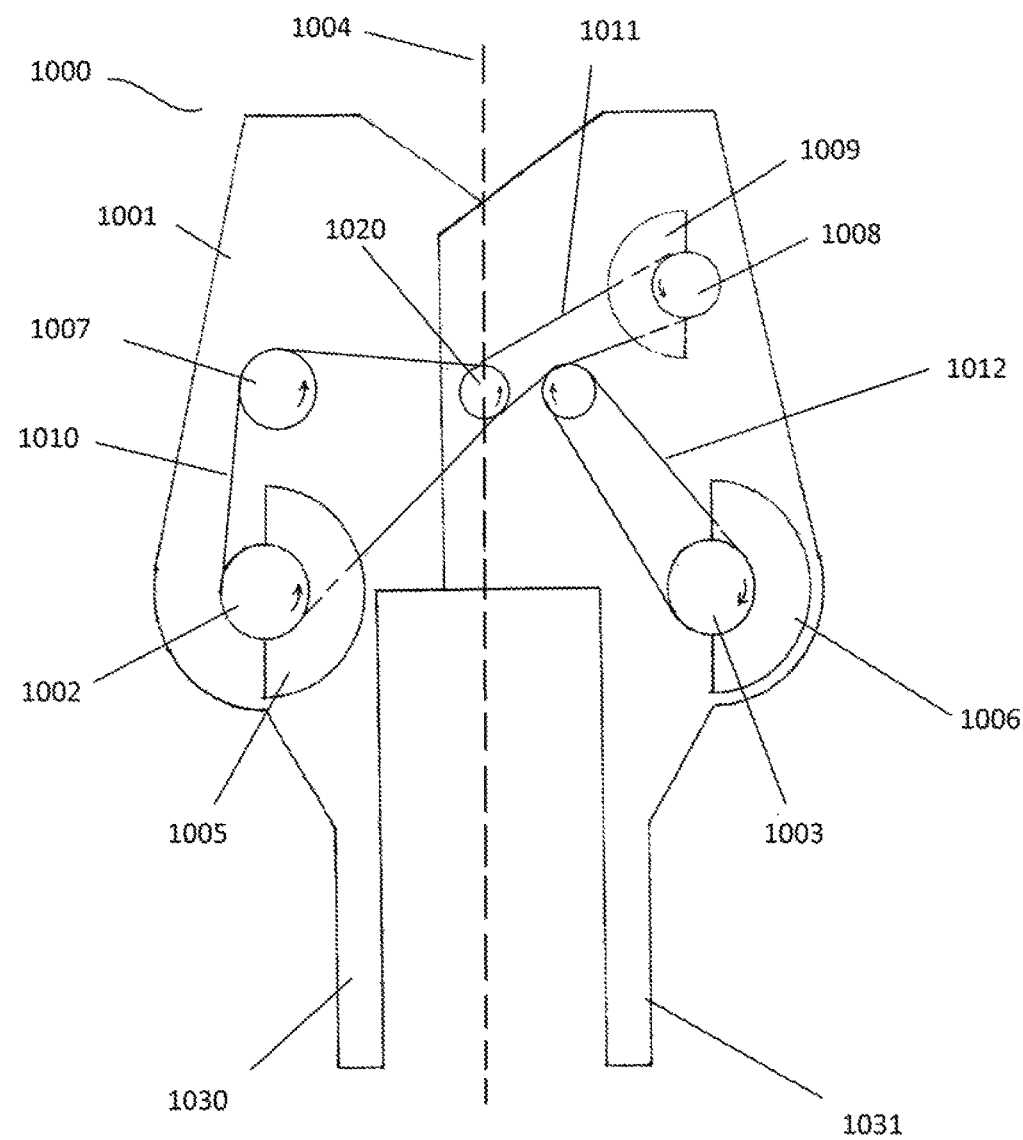
FIG. 2 is a plan view of a shaker head according to an embodiment of the present invention.

Without limiting the invention, FIG. 2 shows an exemplary tree shaker apparatus 1000 that includes a body 1001 which may be connected to a boom that may be attachable to a tractor or other vehicle or trailer. The body 1001 may house parallel rotational shafts 1002 and 1003 are mounted in the body 1001 at a equal distance from a central longitudinal axis or central axis 1004 such that the rotational shafts 1002 and 1003 are symmetrical to each other across the central longitudinal axis of the shaker head 1000. Each rotational shaft 1002 and 1003 has an eccentric weight mounted thereon. Eccentric weight 1005 is mounted on shaft 1002 and eccentric weight 1006 is mounted on shaft 1003. The eccentric weights 1005 and 1006 may be of a matched size, shape, mass, horizontal position, and radius from their respective rotational axis (i.e., the longitudinal axes of the rotational shafts 1002 and 1003).

As shown in FIG. 2, the rotational shafts are indirectly connected to a motor 1007. The arrows in FIG. 1 show that the rotational shafts 1002 and 1003 are connected to the motor through driving chains 1010, 1011, and 1012 and passive rotating shafts 1020 and 1021 such that the rotational shafts rotate in opposite directions. The eccentric weights 1005 and 1006 may be the primary sources of motion in the shaker head 1000, as they may be the largest eccentric weights in the shaker head and they are located in proximity to the shaker arms 1030 and 1031 that are operable to clasp a tree or other object targeted for shaking. The shaker head 1000 may include an additional motor (e.g., a hydraulic motor) for operating the clasping mechanism of the shaker arms 1030 and 1031.

It is also shown that the eccentric weights 1005 and 1006 are aligned in position to the right such that their moments of force will be parallel and laterally directed when they are in this position. Because they are both driven by the same motor at the same angular velocity, they are also in phase when at 180° from the positions shown in FIG. 2, such that their moments of force will be parallel and laterally directed to left (with respect to the representation of FIG. 2). However, at all other positions the eccentric weights 1005 and 1006 are out of phase (e.g., they are 180° out of phase when they rotate 90° from the positions shown in FIG. 2: eccentric weight 1006 will be located at its most distal position relative to the shaker head and eccentric weight 1005 will be located at is most proximal position relative to the shaker head). The counter-rotating arrangement of the rotational generates as little front-to-back and oblique movement as possible when they are arranged to be in phase whenever the center of mass of the eccentric weights are at 90° relative to the central axis of the shaker head. The symmetrical arrangement of the rotational shafts 1002 and 1003 may allow the eccentric weights 1005 and 1006 to be balanced across the shaker head during operation, allowing the rotation of the eccentric weights to be coordinated to reduce inefficient shaking due to force vectors directed in non-targeted directions and reduce unwanted shaking in non-targeted directions. However, the rotation of the eccentric weights cannot be perfectly coordinated such that their moments of force are counter-balancing in all angular positions other than when the eccentric weights are at 90° relative to the central axis of the shaker head 1000. However, it is to be understood that the angular position of the eccentric weights 1005 and 1006 can be subtly adjusted by advancing one or the other by advancing the sprocket wheel attached thereto by one or more positions on the driving chain. The eccentric weights are held fast in their new angular positions by the "locking" relationship between the driving chain(s) and the sprocket wheels on the rotational shafts 1002 and 1003 of the eccentric weights.

To further reduce the inefficient shaking of the shaker head 1000, a third rotational shaft 1008 having an eccentric weight 1009 mounted thereon may be included in the shaker head 1000. The angular position of the third eccentric weight 1009 relative to the angular positions of the eccentric weights 1005 and 1006 may be chosen and adjusted to compensate for a particular type of superfluous motion (e.g., pitching, rolling, or yaw) that may be generated by the rotation of the eccentric weights 1005 and 1006. Without limiting the invention, the third eccentric weight may have a different mass, a rotational shaft having a different radius than those of the symmetrically positioned eccentric masses (e.g., a smaller diameter) such that it rotates at a different angular velocity, and/or a different radius from the rotational shaft. In FIG. 2, the third eccentric weight is shown as offset from a central axis of the shaker head. However, it is to be understood that the third eccentric weight may be located along the central axis of the shaker head. Additionally, it is contemplated within the scope of the present invention that the shaker head may include additional eccentric weights (e.g., a fourth eccentric weight) that may be utilized to help in counteracting inefficient shaking in the shaker head that results from the two symmetrically positioned eccentric weights that provide the primary shaking motion of the shaker head.

Figure 3:
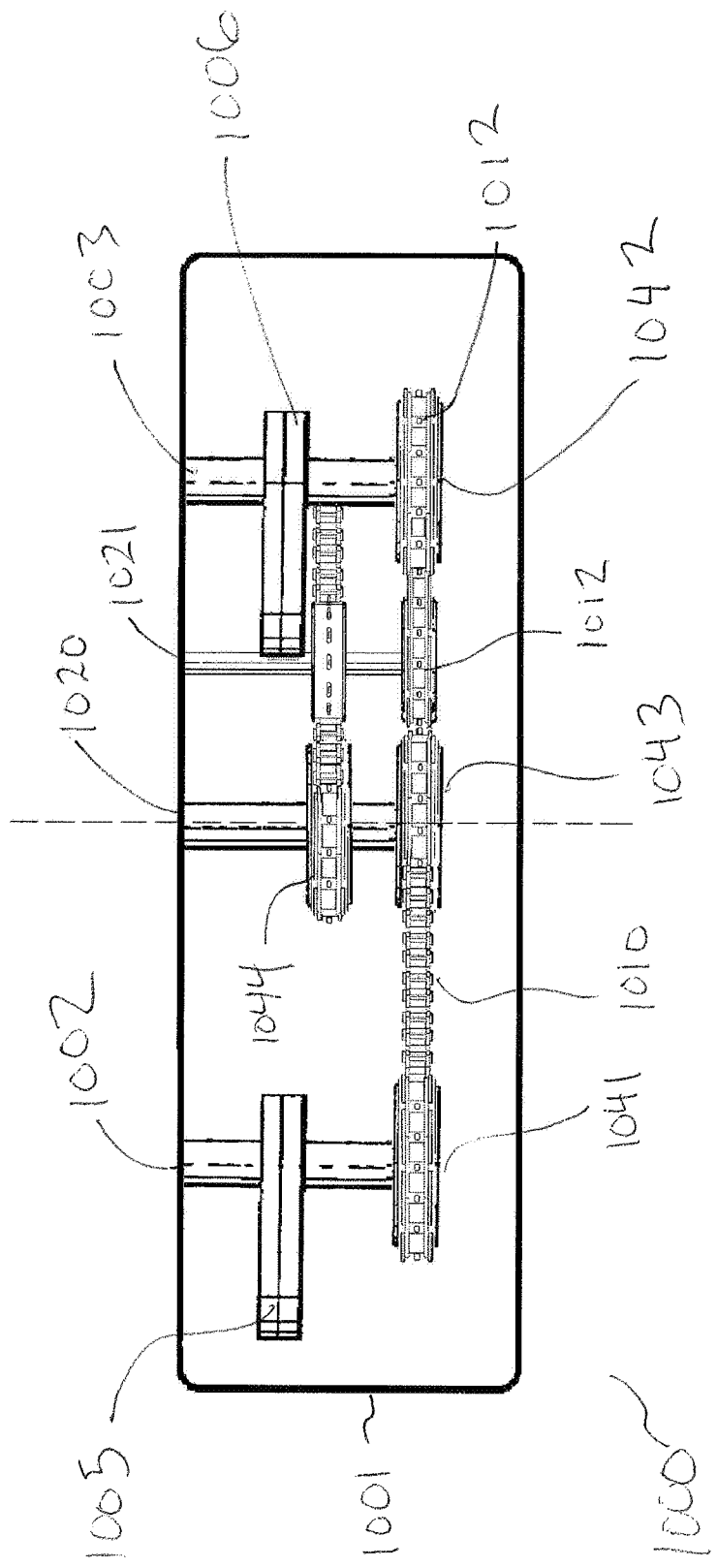
FIG. 3 is a plan view of a shaker head according to another embodiment of the present invention.

FIG. 3 provides a cross-sectional view of the shaker head 1000 taken across the shaker head along a plane perpendicular to the central axis 1004. The symmetrically positioned eccentric weights 1005 and 1006 are shown to be on the same horizontal plane and in phase as their angular positions are at 90° relative to the central axis 1004 of the shaker head. It can be seen in FIG. 3 that the rotational axles may each having one or more sprocket wheels. For example, rotational shafts 1002 and 1003 each have a single sprocket wheel (e.g., 1041 and 1042, respectively) for engaging a driving chain (e.g., 1010 and 1012, respectively). Central passive rotational shaft 1020 has two sprocket wheels 1043 and 1044 to enable its role in transmitting the rotational force of the motor to the driving chain 1011. Note that the view of the third eccentric weight 1009 and the rotational shaft 1008 is obstructed by the rotational shaft 1003 and eccentric weight 1006.

Figure 4:
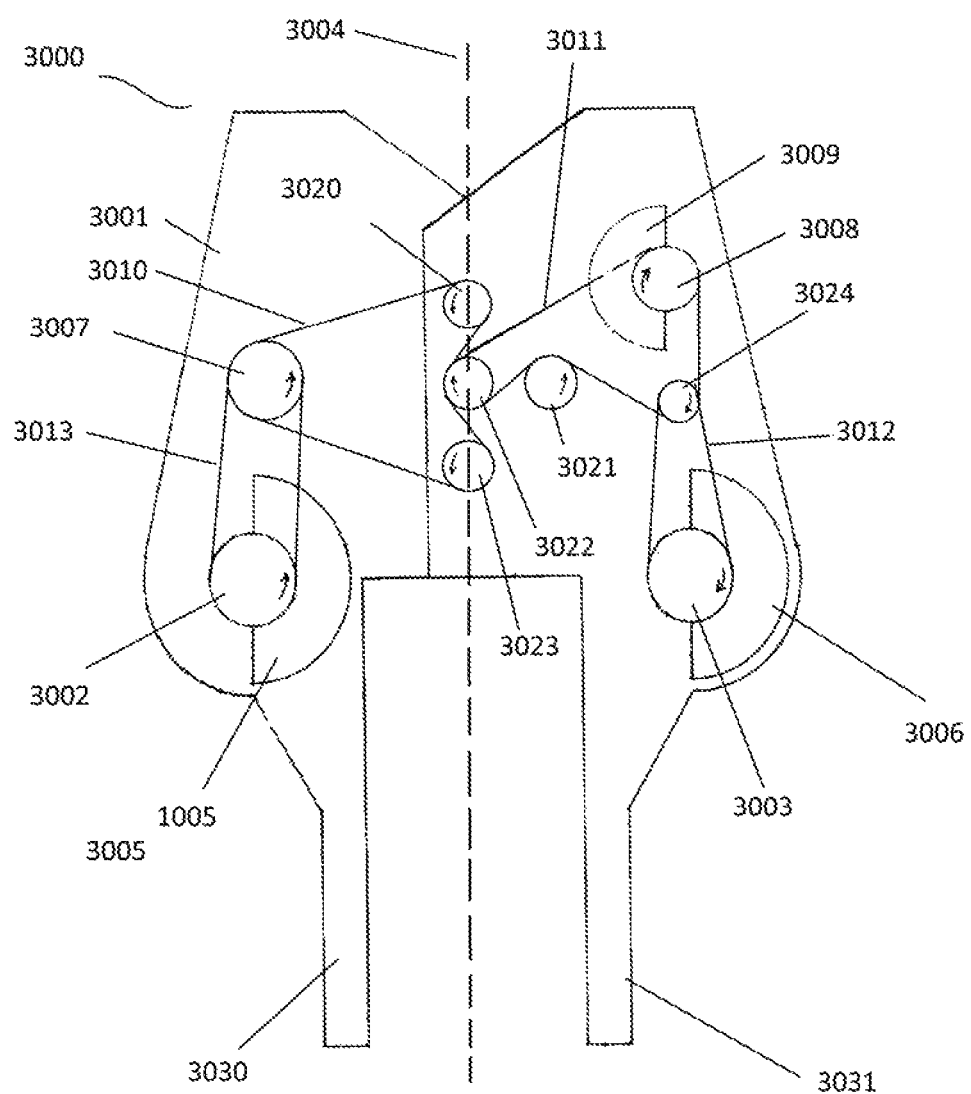
FIG. 4 is a cross-sectional view of a shaker head according to an embodiment of the present invention.

Without limiting the invention, FIG. 4 shows an alternative embodiment of a shaker head according to the present invention. Shaker head 3000 has similar elements to the shaker head 1000 shown in FIGS. 2-3 and similar parts therein have similar reference numbers to those of FIGS. 2-3. The major difference between the embodiments of the FIG. 2 and FIG. 4 is the number and arrangement of the passive rotational shafts that transmit the rotational force of the motor between the driving chains. The first and second bilaterally positioned eccentric weights 3005 and 3006 have the same mass and shape, and are positioned on the same rotational plane. They are spun by the same motor 3007 and are connected to the motor 3007 directly or indirectly by interlocking engagement with the roller chains of the shaker 3000, such that there is no slippage or variance in angular velocity between the bilaterally positioned eccentric weights 3005 and 3006.

In embodiment shown in FIG. 4 includes additional idler sprockets and roller chains, with three idler sprockets 3020, 3022, and 3023 aligned along the central axis 3004 to minimize the effect of oblique forces created by the forces applied to the idler sprockets. There may also be a lateral idler sprocket 3024 located bilaterally with respect to the motor 3007, such that the undesired forces and motions created by the motor 3007 and the idler sprocket 3024 can offset one another, at least in part.

The example of FIG. 4 includes four roller chains connecting the motor 3007 directly or indirectly with the rotational shafts 3002, 3003, and 3008 of the eccentric weights. A first roller chain 3010 is routed in succession from the motor 3007 (counter-clockwise rotation as indicated by the arrow) to the idler sprocket 3020 (counter-clockwise rotation as indicated by the arrow), idler sprocket 3022 (clockwise rotation as indicated by the arrow), idler sprocket 3023 (counter-clockwise rotation as indicated by the arrow), and then back to the motor drive shaft. The roller chain 3010 interlockingly engages with idler sprocket 3020, idler sprocket 3022, idler sprocket 3023, and the motor drive shaft, to prevent any slippage or variance in angular velocity of these structures.

A second roller chain 3011 is routed in succession from the idler sprocket 3022 (clockwise rotation as indicated by the arrow), to a first lateral idler sprocket 3021 (counter-clockwise rotation as indicated by the arrow), to a second lateral idler sprocket 3024 (clockwise rotation as indicated by the arrow), to the rotational shaft 3008 of the third eccentric weight 3009, and back to the second idler shaft 3022. The roller chain 3011 interlockingly engages with idler sprocket 3022, the first lateral idler sprocket 3021, the second lateral idler sprocket 3024, and the rotational shaft 3008 of the third eccentric weight 3009 to prevent any slippage or variance in angular velocity of these structures.

The third roller chain 3012 is routed from the second lateral idler sprocket 3024 (clockwise rotation as indicated by the arrow) to the rotational shaft 3003 of second bilaterally positioned eccentric weight 3006 (counter-clockwise rotation as indicated by the arrow), to a second lateral idler sprocket 3024 (clockwise rotation as indicated by the arrow), and back to the second lateral idler sprocket 3024. The roller chain 3012 interlockingly engages with idler sprocket 3024 and the rotational shaft 3003 of the second bilaterally positioned eccentric weight 3006 to prevent any slippage or variance in angular velocity of these structures.

The fourth roller chain 3013 is routed from the rotational shaft of the motor 3007 (counter-clockwise rotation as indicated by the arrow) to the rotational shaft 3002 of first bilaterally positioned eccentric weight 3005 (counter-clockwise rotation as indicated by the arrow), and back to the rotational shaft of the motor 3007. The roller chain 3013 interlockingly engages with driving shaft of the motor 3007 and the rotational shaft 3002 of the first bilaterally positioned eccentric weight 3005 to prevent any slippage or variance in angular velocity of these structures. Other arrangements of passive rotational shafts, sprocket wheels, and driving chains are also within the scope of the present invention.

Figure 5:
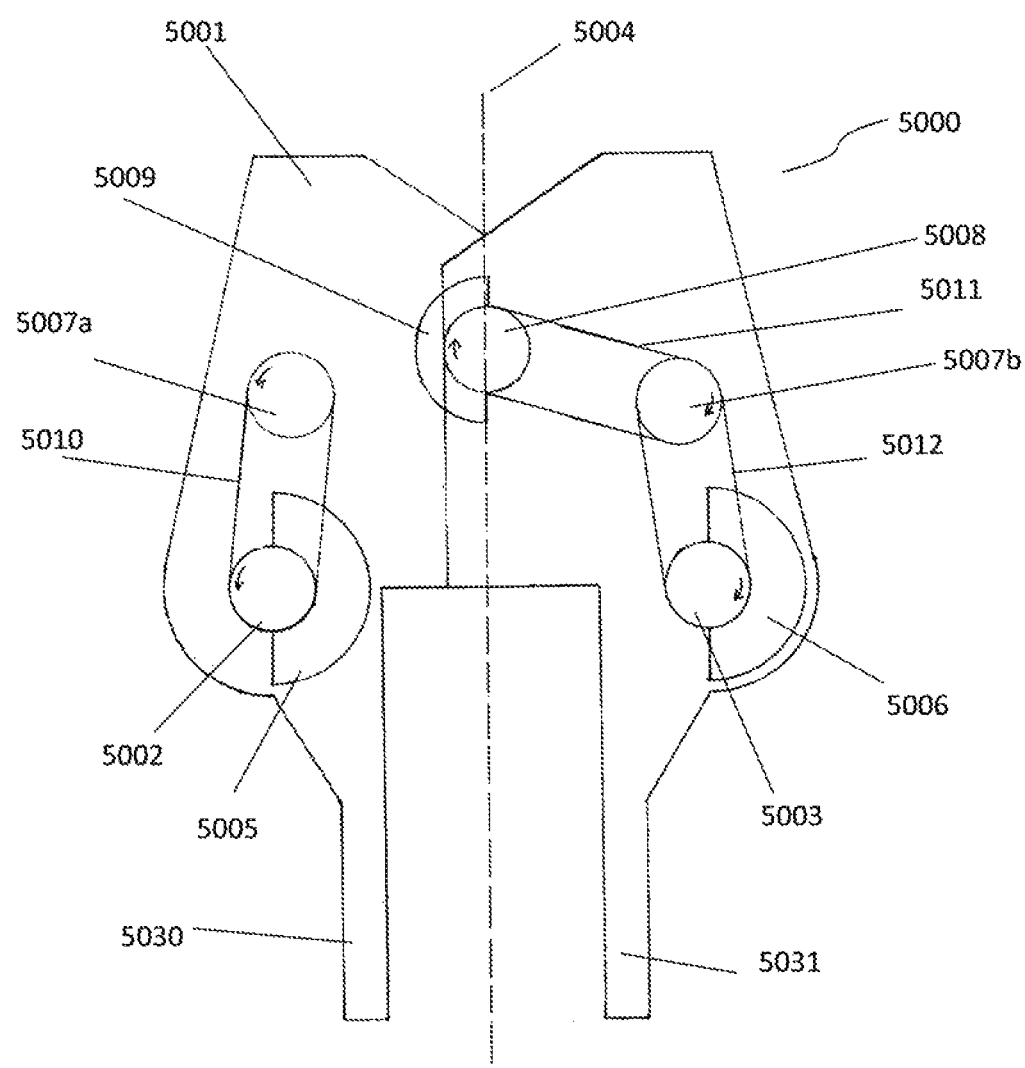
FIG. 5 is a plan view of a shaker head according to an embodiment of the present invention.

In some embodiments, the shaker head may not include any passive (idler) sprockets, and may instead include a design in which there is a motor on each side of the shaker head, and the rotational shafts of the eccentric weights are connected by roller chain (or other interlocking chain or belt) to sprockets mounted directly on the rotating drive shaft of the corresponding motor. FIG. 5 provides a view of an exemplary shaker head 5000 having hydraulic clamp arms 5030 and 5031 for grasping the trunk of a tree. In this examples, the shaker head 5000 has a first motor 5007a may be positioned within a first lateral side of the shaker head 5000 along with a first bilateral eccentric weight 5005 having a rotational shaft 5002 connected with a driving shaft of the first motor 5007a by a roller chain 5010, and a second motor 5007b that may be positioned within a second lateral side of the shaker head 5000 along with a second bilateral eccentric weight 5006 having a rotational shaft 5003 connected with a driving shaft of the second motor 5007b by a roller chain 5012, and a third eccentric weight 5009 having a rotational shaft connected to a drive shaft of the second motor 5007b by a roller chain 5011. As in other embodiments, the bilaterally positioned eccentric weights 5005 and 5006 may be of the same mass and shape, located on the same rotational plane and equidistant from the central axis 5004 of the shaker head 5000. But, in such embodiments, the rotational shaft of each eccentric weight may be directly connected to the driving shaft of the motor located on the same lateral side of the shaker head by a roller chain with no intervening idler sprockets. In such embodiments, the number of rotational shafts on which torques are created is reduced thereby limiting the potential angular momentum directed at angles that are oblique or perpendicular to the desired lateral shaking motion. As shown in FIG. 5, such embodiments may have additional features that further reduce undesired forces and motion in the shaker head. For instance, the first and second motors may be bilaterally positioned with in the shaker head such that oblique forces generated by the motors may be offset. Additionally, the third eccentric weight may be positioned along the central axis of the shaker head to further aid in reduce the undesired motion of the shaker head. For example, any upward or downward angular moments that result from the torque applied to the rotational shaft of the centrally located third eccentric weight may be directed along the plane of the central axis of the shaker head, thereby reducing any rolling or yawing effects that such moments would have if the sprocket were located at a lateral position.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. A shaker mechanism for use in a tree shaker having a mobile frame and means for engaging a tree, comprising:
   a. two bilaterally positioned eccentric weights symmetrically positioned with respect to a central axis of a shaker head on a same plane of rotation, wherein said bilaterally positioned eccentric weights are operable to rotate at the same angular velocity during operation, and centers of mass of said two laterally positioned eccentric weights are in phase in a first instance and a second instance during each 360° rotation of the two laterally positioned eccentric weights, said centers of mass of said two bilaterally positioned eccentric weights being in phase in said first instance in alignment along a line that is perpendicular to the central axis of the shaker head such that said centers of mass are at their closest point to a first lateral side of said shaker head, and said centers of mass of said two bilaterally positioned eccentric weights being in phase in said second instance along said line that is perpendicular to the central axis of the shaker head such that said centers of mass are at their closest point to a second lateral side of said shaker head;
   b. at least one central sprocket wheel located on said central axis of said shaker head;
   c. a motor for driving the rotation of said bilaterally positioned eccentric weights; and
   d. at least one drive chain or belt operable to engage with sprockets on rotational shafts of said bilaterally positioned eccentric weights.

2. The shaker mechanism of claim 1, wherein said motor is the only source of motion driving rotation of said bilaterally positioned eccentric weights.

3. The shaker mechanism of claim 1, wherein said laterally positioned eccentric weights have the same mass.

4. The shaker mechanism of claim 1, wherein said laterally positioned eccentric weights have the same size and shape.

5. The shaker mechanism of claim 3, wherein said laterally positioned eccentric weights are located at a same radius from their respective rotational axes.

6. The shaker mechanism of claim 1, further comprising a third eccentric weight positioned proximally relative to said two laterally positioned eccentric weights.

7. The shaker mechanism of claim 6, wherein said third eccentric weight and said two laterally positioned eccentric weights are located on a same horizontal plane.

8. The shaker mechanism of claim 7, wherein said at least one drive chain or belt is engaged with said third eccentric weight.

9. The shaker mechanism of claim 8, wherein said third eccentric weight includes sprockets on a shaft thereof, and said at least one drive chain or belt engages with said sprockets such that there is no substantial variation in an angular velocity of the third eccentric weight relative to angular velocities of said laterally positioned eccentric weights during a shaking operation of said shaker mechanism.

10. A shaker head comprising:
    a mechanical clamp for firmly grasping a tree trunk;
    two bilaterally positioned eccentric weights rotatably mounted on said shaker head, said eccentric weights collaterally aligned and symmetrically spaced from a central axis of said shaker head, wherein rotational axes of said eccentric weights are parallel to each other and perpendicular to said central axis of said shaker head
    a third eccentric weight positioned proximally relative to said two bilaterally positioned eccentric weights, said collateral eccentric weights and said third eccentric weight are located on a same horizontal plane; and
    a single driving motor connected to said bilaterally positioned eccentric weights and said third eccentric weight by at least one driving chain or belt, wherein said at least one driving chain or belt engages with rotational shafts of said bilaterally positioned eccentric weights and said third eccentric weight such that there is no substantial variation in angular velocity between said bilaterally positioned eccentric weights and the third eccentric weight during a shaking operation of said shaker head.

11. The shaker head of claim 10, wherein said motor is the only source of motion driving rotation of said collateral eccentric weights and said third eccentric weight.

12. The shaker head of claim 10, wherein said bilaterally positioned eccentric weights have the same mass, size, and shape, and are located on a same horizontal plane and at a same radius from their respective rotational axes.

13. The shaker mechanism of claim 10, wherein said bilaterally positioned eccentric weights are operable to rotate at the same angular velocity during operation, and centers of mass of said two laterally positioned eccentric weights are in phase in a first instance and a second instance during each 360° rotation of the two bilaterally positioned eccentric weights.

14. The shaker mechanism of claim 13, wherein said centers of mass of said two bilaterally positioned eccentric weights are in phase in said first instance along a line that is perpendicular to the central axis of the shaker head such that said centers of mass are at their closest point to a first lateral side of said shaker head, and said centers of mass of said two bilaterally positioned eccentric weights are in phase in said second instance along a line that is perpendicular to the central axis of the shaker head such that said centers of mass are at their closest point to a second lateral side of said shaker head.

15. A shaker mechanism for use in a tree shaker having a mobile frame and means for engaging a tree, comprising:
   a. two bilaterally positioned eccentric weights symmetrically positioned with respect to a central axis of a shaker head on a same plane of rotation;
   b. at least one central sprocket wheel located on said central axis of said shaker head;
   c. a motor for driving the rotation of said bilaterally positioned eccentric weights;
   d. a third eccentric weight, wherein said third eccentric weight and said two laterally positioned eccentric weights are located on a same horizontal plane; and
   e. at least one drive chain or belt operable to engage with sprockets on rotational shafts of said bilaterally positioned eccentric weights.

16. The shaker mechanism of claim 15, wherein said motor is the only source of motion driving rotation of said bilaterally positioned eccentric weights.

17. The shaker mechanism of claim 15, wherein said bilaterally positioned eccentric weights are operable to rotate at the same angular velocity during operation, and centers of mass of said two laterally positioned eccentric weights are in phase in a first instance and a second instance during each 360° rotation of the two laterally positioned eccentric weights.

18. The shaker mechanism of claim 17, wherein said centers of mass of said two bilaterally positioned eccentric weights are in phase in said first instance along a line that is perpendicular to the central axis of the shaker head such that said centers of mass are at their closest point to a first lateral side of said shaker head, and said centers of mass of said two bilaterally positioned eccentric weights are in phase in said second instance along a line that is perpendicular to the central axis of the shaker head such that said centers of mass are at their closest point to a second lateral side of said shaker head.

19. The shaker mechanism of claim 15, wherein said at least one drive chain or belt is engaged with said third eccentric weight.

20. The shaker mechanism of claim 15, wherein said bilaterally positioned eccentric weights have the same mass, size, and shape, and are located at a same radius from their respective rotational axes.

* * * * *